United States Patent [19]

Ekstrand

[11] Patent Number: 4,988,942
[45] Date of Patent: Jan. 29, 1991

[54] SWITCHED RESISTOR REGULATOR CONTROL WHEN TRANSFER FUNCTION INCLUDES DISCONTINUITY

[75] Inventor: John P. Ekstrand, Palo Alto, Calif.

[73] Assignee: Spectra-Physics, Inc., San Jose, Calif.

[21] Appl. No.: 269,238.

[22] Filed: Nov. 8, 1988

[51] Int. Cl.[5] .............................................. G05F 1/56
[52] U.S. Cl. ..................................... 323/282; 363/89; 307/106
[58] Field of Search ............... 323/282, 283, 284, 285, 323/288, 292, 293-298, 351-354, 364, 369; 363/84, 86, 89; 307/106

[56] References Cited

U.S. PATENT DOCUMENTS

| 3,835,368 | 9/1974 | Williams | 323/282 X |
|---|---|---|---|
| 4,316,136 | 2/1982 | Saxarra et al. | 323/282 |
| 4,347,474 | 8/1982 | Brooks et al. | 323/282 X |
| 4,420,700 | 12/1983 | Fay et al. | 323/282 X |
| 4,521,726 | 6/1985 | Budnik | 323/283 |
| 4,607,210 | 8/1986 | Ohms et al. | 323/351 X |
| 4,668,906 | 5/1987 | Ekstrand | 323/297 |
| 4,683,415 | 7/1987 | Zimmerman | 323/282 |
| 4,719,404 | 1/1988 | Ekstrand | 323/297 |
| 4,814,966 | 3/1989 | Ekstrand | 323/297 X |
| 4,816,741 | 3/1989 | Ekstrand | 323/297 |

Primary Examiner—Steven L. Stephan
Assistant Examiner—Emanuel Todd Voeltz
Attorney, Agent, or Firm—Lyon & Lyon

[57] ABSTRACT

A DC control voltage being supplied to a pulse-width modulator in a switched resistor regulator control feedback loop is modified by addition of an AC offset voltage dither signal; the sum of the DC and AC voltages suffices to "turn on" the pulse-width modulator in some, but not all, of the periods of the output pulse train of the pulse-width modulator. The output pulse train controls the switch in a switched resistor regulator to turn on for a minimum period of time in some, but not all, of the periods of switching the resistor into and out of electrical connection. Thus the switched resistor regulator obtains an average duty cycle which is substantially less than the duty cycle which could be obtained with the minimum pulse width. In an alternate embodiment, a switched resistor regulator is controlled by a plurality of switches (e.g. a pair of switches whose periods of switching the resistor into and out of electrical connection are phase offset) whose minimum "turn on" voltage is staggered with respect to each other. Thus the minimum change in pulse width of the output pulse train of the pulse-width modulator is reduced, and the effective discontinuity in changes of pulse width output due to changes of the control voltage is reduced in slope.

47 Claims, 3 Drawing Sheets

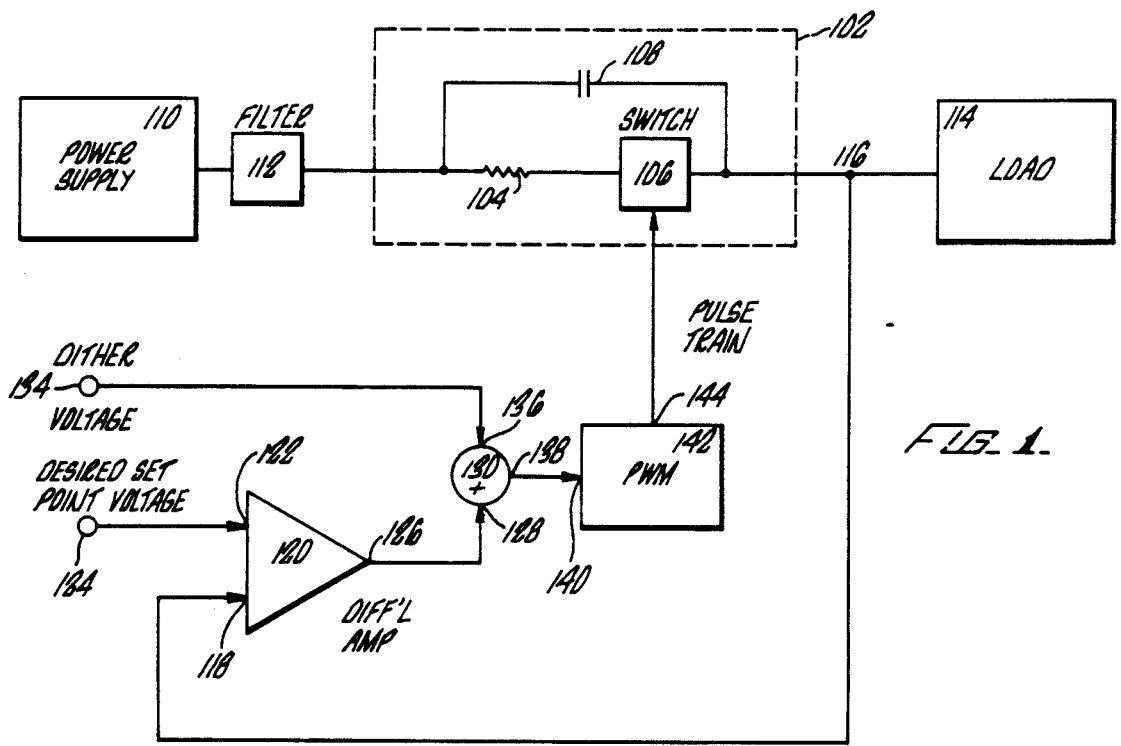
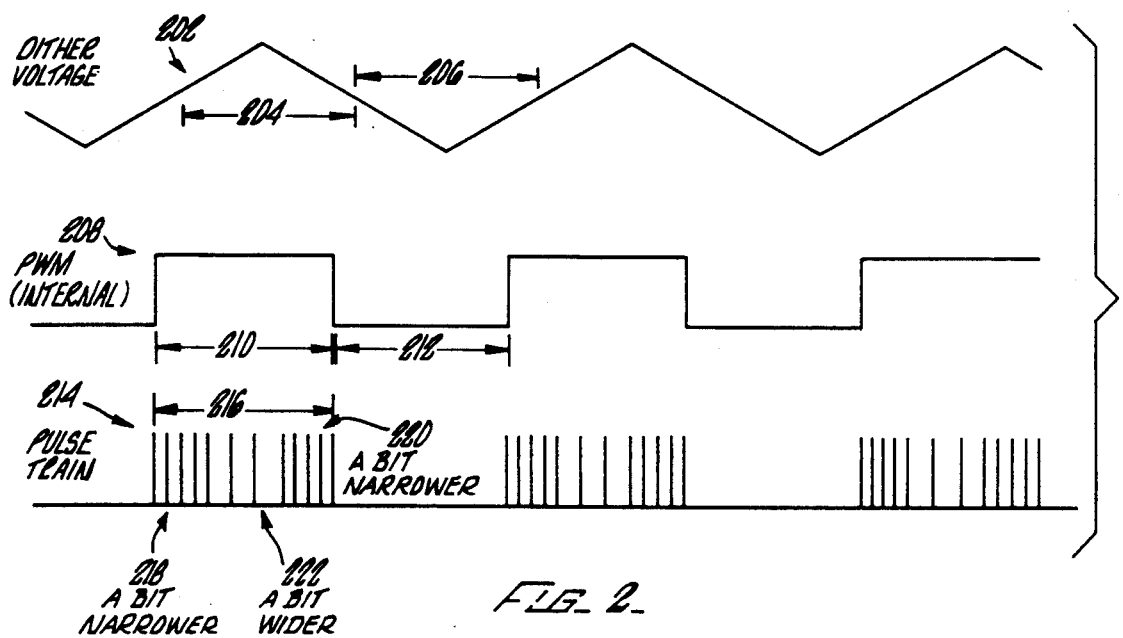

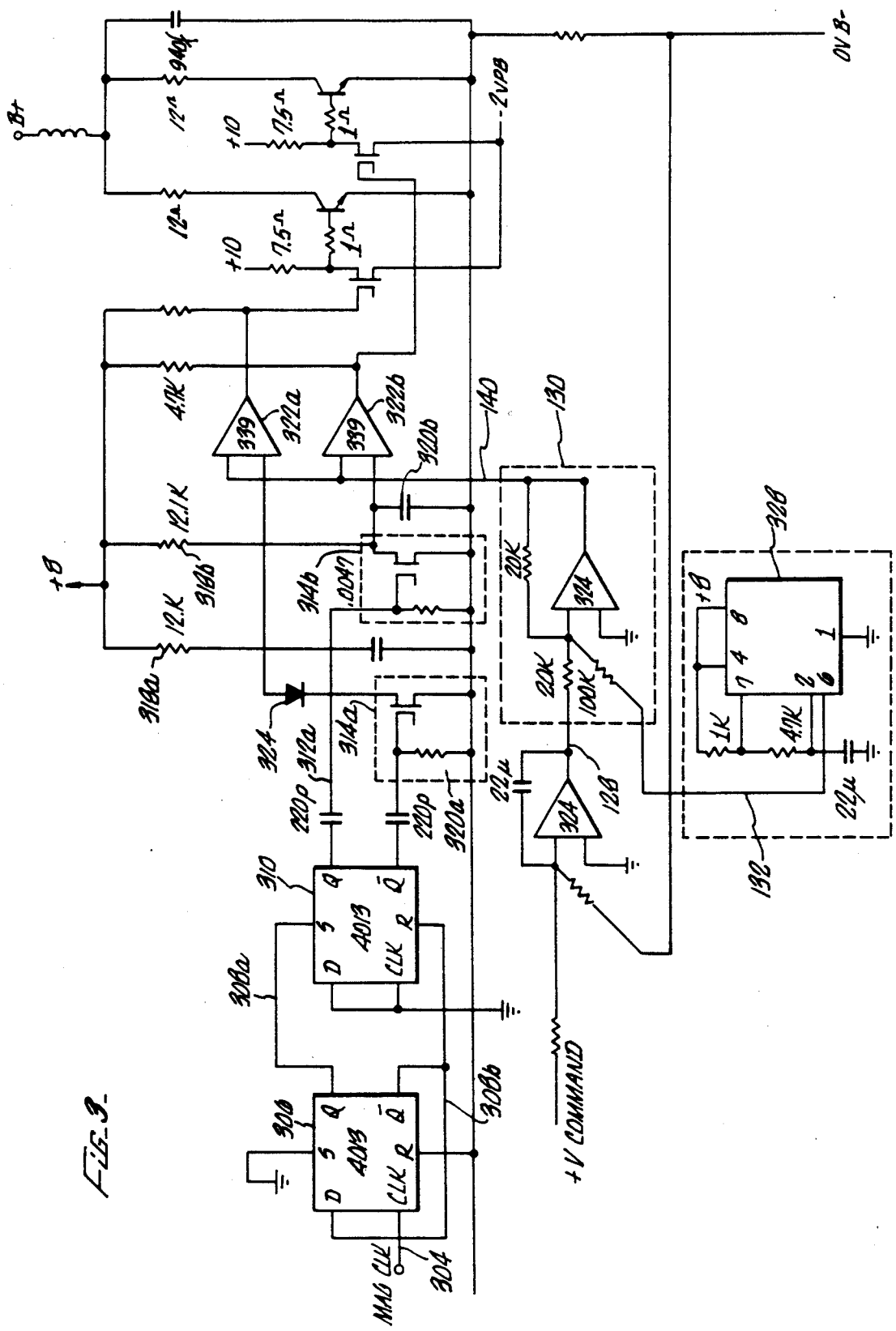

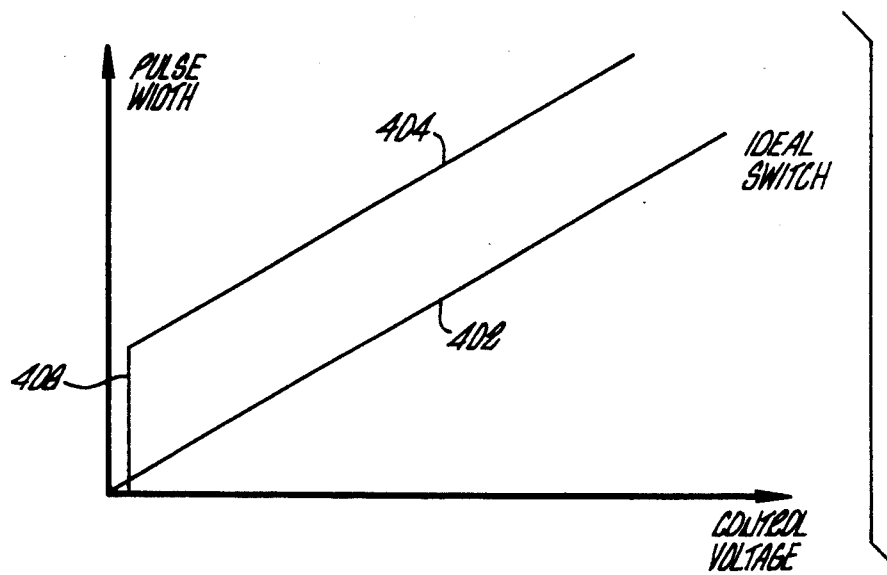
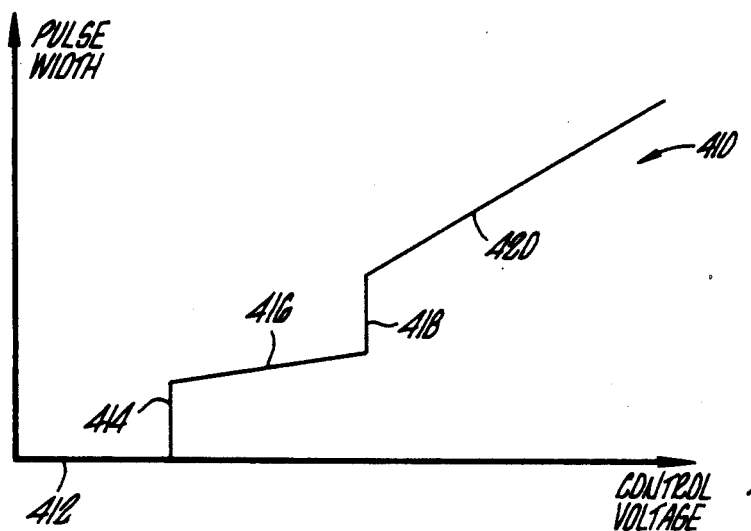
FIG. 4.

SWITCHED RESISTOR REGULATOR CONTROL WHEN TRANSFER FUNCTION INCLUDES DISCONTINUITY

BACKGROUND OF THE INVENTION

1. Field of the Invention

This invention relates to switched resistor regulators. More specifically, this invention relates to controlling switched resistor regulators when the transfer function of a component pulse width modulator includes a discontinuity.

2. Description of Related Art

A switched resistor regulator ("SRR") is a type of power supply regulator, characterized by switching a resistor into and out of electrical connection between a power source and a load. SRRs and their operation are fully disclosed in U.S. Pat. No. 4,668,906, issued May 26, 1987 in the name of inventor John P. Ekstrand, and assigned to the same assignee, disclosed in U.S. Pat. No. 4,719,404, issued Jan. 12, 1988 in the name of inventor John P. Ekstrand, and assigned to the same assignee, hereby incorporated by reference as if fully set forth herein, and in co-pending applications titled "SWITCHED RESISTOR REGULATOR WITH DIODE SNUBBER FOR PARASITIC INDUCANCE IN SWITCHED RESISTOR", Ser. No. 102,982, filed Sept. 30, 1988 in the name of inventor John P. Ekstrand, and assigned to the same assignee, and titled "SHUNT SWITCHED RESISTOR REGULATOR WITH DIODE SNUBBER", Ser. No. 103,095, filed Sept. 30, 1988 in the name of inventor John P. Ekstrand, and assigned to the same assignee, all hereby incorporated by reference as if fully set forth herein.

Further information on switched resistor regulators and their use is found in a co-pending application titled "FEEDBACK LOOP GAIN COMPENSATION FOR A SWITCHED RESISTOR REGULATOR", Ser. No. 269,194, filed this same day in the name of inventors John P. Ekstrand and Kevin Holsinger, and assigned to the same assignee, hereby incorporated by reference as if fully set forth herein.

A typical SRR employs a pulse-width modulator ("PWM") to generate a pulse train, which is applied to the switch for switching the resistor into and out of electrical connection. A problem arises in operation of the SRR when it is desired to limit electrical connection of the resistor to a low duty cycle. In such cases, the PWM may generate pulses which are quite narrow in width, but the switch may be unable to switch the resistor into electrical connection for only the short duration of the pulse. This problem may typically arise because the switch being employed is a transistor and the storage charge on the transistor prevents switching the resistor into electrical connection for less than a predetermined minimum period of time, e.g. 8-10 microseconds. This is reflected by an abrupt rise in pulse width between a control voltage which is slightly less than a minimum threshold for the PWM to a control voltage which is slightly greater than the minimum threshold. This abrupt rise is referred to herein as a discontinuity in the transfer function of the PWM.

In such cases, a feedback circuit employed by the SRR for stabilizing the pulse width will be subject to a problem: On the one hand, if the feedback circuit operates with a relatively small time constant, it will shift rapidly back and forth between operating states just below and just above the discontinuity in the transfer function of the PWM; this effect is well known in the art of regulator control. On the other hand, if the feedback circuit operates with a large time constant, it will take substantial time to arrive at a stable state in response to changes in the input control voltage. This effect can degrade the performance of powered systems whose power is being supplied by the SRR.

SUMMARY OF THE INVENTION

A DC control voltage being supplied to a pulse-width modulator in a switched resistor regulator control feedback loop is modified by addition of a dither signal; the sum of the DC and dither voltages suffices to "turn on" the pulse-width modulator in part, but not all, of the period of the dither signal. The output pulse train controls the switch in a switched resistor regulator to turn on for a minimum period of time in some, but not all, of the periods of switching the resistor into and out of electrical connection. Thus the switched resistor regulator obtains an average duty cycle which is substantially less than the duty cycle which could be obtained with the minimum pulse width.

In an alternate embodiment, a switched resistor regulator is controlled by a plurality of switches (e.g. a pair of switches whose periods of switching the resistor into and out of electrical connection are phase offset) whose minimum "turn on" voltage is staggered with respect to each other. Thus the size of the discontinuity in the effective pulse width output due to changes of the control voltage is reduced.

BRIEF DESCRIPTION OF THE DRAWINGS

FIG. 1 shows a block diagram of a feedback loop employed for control of a switched resistor regulator.

FIG. 2 shows several waveforms generated by the circuit of FIG. 1.

FIG. 3 shows a circuit diagram of a switched resistor regulator.

FIG. 4 shows several response curves for switched resistor regulators.

DESCRIPTION OF THE PREFERRED EMBODIMENT

FIG. 1 shows a block diagram of a switched resistor regulator ("SRR") and a feedback loop employed for control of that SRR. As is well known in the art, one configuration 102 of a SRR comprises a resistor 104, a switch 106, and a capacitor 108, and is electrically connected in series between an unregulated power supply 110 and filter 112, and a load 114. A voltage proportional to the current received by the load 114 appears at node 116, and is further transmitted to a first input 118 of a differential amplifier 120. A second input 122 of the differential amplifier 120 is set to a desired set point voltage at node 124.

In a preferred embodiment of the invention, an output 126 of the differential amplifier 120 generates a control voltage which is transmitted to a first input 128 of a summing circuit 130. A dither wave is applied at node 134, which is transmitted to a second input 136 of the summing circuit 130. The summing circuit 130 generates an altered control voltage at an output node 138.

The altered control voltage at node 138 is transmitted to an input 140 of a pulse-width modulator ("PWM") 142. The PWM 142 generates an output pulse train at an output node 144, which is transmitted to and controls switch 106. When a configuration 102 of a SRR comprises more than one switch 106, output node 144 may comprise a plurality of nodes, e.g. nodes 144a–b, for control of a plurality of switches 106.

FIG. 2 shows several waveforms generated by the circuit of FIG. 1. Waveform 202 shows a time-varying voltage signal which appears at node 134. The voltage signal at node 134 is shown herein as a triangular wave, but it will become clear to one of ordinary skill in the art, after perusal of the specification, drawings and claims herein, that other waveforms may be employed in an embodiment of the invention, and remain within the concept and scope of the invention. The voltage signal at node 134 serves to offset the control voltage at node 126 by a positive amount at some times 204 and by a negative amount at other times 206. Actual positive and negative times may vary based on a DC offset (not shown) which the triangular wave generator 132 may add to the signal it generates, but in a preferred embodiment this DC offset (not shown) is zero.

The desired set point voltage at node 124 and the dither wave at node 134 are combined by the summing circuit 130 to provide a modified control voltage for the PWM 142. The PWM 142 requires a minimum input voltage for it to activate and generate a pulse train at its output node 144; when the voltage at its input 140 is less than this minimum input voltage, no pulse train is generated. Waveform 208 shows those times when the PWM 142 is activated by the sum of the desired set point voltage at node 124 and the dither wave at node 134; activated times 210 are shown by a high voltage, while unactivated times 212 are shown by a low votlage.

Waveform 214 shows a pulse train which may be generated at node 144 when the voltage at node 126 is less than the minimum input voltage to activate PWM 142. The sum of the voltage at node 126 and the dither wave at node 134 cause the PWM 142 to activate during activated times 210 and generate a series of pulses 216 during those activated times 210. Because of the time-varying nature of the dither wave, each series of pulses 216 will comprise somewhat narrower pulses 218 near the beginning and 220 near the end of the series of pulses 216, and somewhat wider pulses 222 near the middle of the series of pulses 216.

FIG. 3 shows a circuit diagram of one configuration of a switched resistor regulator and control circuitry. A clock signal on path 304 is transmitted to a divide-by-two circuit 306, which generates a half-clock signal on a pair of paths 308a–b. The half-clock signal on paths 308a–b is transmitted to a buffer 310, which generates a pair of out-of-phase pulse signals on signal paths 312a–b respectively. The out-of-phase pulse signals on paths 312a–b are transmitted to a pair of reset-on-pulse circuits 314a–b respectively, each of which discharges a capacitor 320a–b respectively. The capacitors are recharged via timing resistors 318a–b respectively.

In a preferred embodiment, the modified control voltage is applied at an input 140, and compared by two comparators 322a–b to produce pulses at node 144a–b.

A diode 324 is electrically connected in series with a FET 326 in reset-on-pulse circuit 314a to stagger the minimum turn-on voltages of the switches in reset-on-pulse circuits 314a and 314b. The forward voltage of the diode 324 offsets the two reference voltage timing waveforms appearing on paths 312a–b, so that the two comparators 322a–b provide different pulse widths for the same modified control voltage applied at the input 140. Dither oscillator 328 provides a dither signal to an output 132, which is summed with the control voltage at node 128 in the summing circuit 130 to produce the modified control voltage at node 140.

FIG. 4A shows several response curves for SRRs. Curve 402 shows the response of an ideal SRR, in which pulse width is linear with control voltage (at node 140) over the entire range of possible control voltages. Curve 404 shows the response of a real SRR, in which the pulse width is linear over a linear part 406 of the range of possible control voltages, and exhibits a discontinuity 408.

Curve 4B shows the response of a two-phase SRR with timing waveforms which are offset from one another. A zero part 412 shows the response when neither transistor is turning on. A first discontinuity 414 is produced when the first transistor begins switching at minimum duty factor. A half-slope part 416 shows the response, with a slope one-half of the ideal slope part 420, when only one transistor is switching. A second discontinuity 418 is produced when the second transistor begins switching at its minimum duty factor. An ideal slope part 420 shows the (ideal) response that is produced when both transistors are switching at greater than minimum duty cycle.

While a preferred embodiment is disclosed herein, many variations are possible which remain within the concept and scope of the invention, and these variations would become clear to one of ordinary skill in the art after perusal of the specification, drawings and claims herein.

I claim:

1. A switched resistor regulator, comprising
means for receiving a signal indicative of a duty cycle; and
means responsive to said signal for periodically switching according to an average duty cycle equal to said duty cycle, by periodically switching according to said duty cycle and according to a predetermined first period, and by periodically switching according to a minimum duty cycle and a second period when said signal indicates a duty cycle less than said minimum duty cycle.

2. A switched resistor regulator, comprising
means for receiving a signal indicative of a duty cycle; and
means responsive to said signal for periodically switching according to said duty cycle and according to a predetermined period, and for periodically switching according to a minimum duty cycle less often than once per said period when said signal indicates a duty cycle less than said minimum duty cycle.

3. A switched resistor regulator as in claim 2, comprising
a circuit;
resistive means;
wherein said means for periodically switching comprises a plurality of means for switching said resistive means into and out of electrical connection with said circuit; and
means for staggering a minimum turn-on voltage of at least one of said plurality of means for switching, whereby said minimum turn-on voltage of said one of said plurality of means for switching differs from a minimum turn-on voltage of a second one of said plurality of means for switching.

4. A switched resistor regulator, comprising means for receiving a first signal indicative of a first duty cycle;

means responsive to a second signal indicative of a second duty cycle for periodically switching according to said second duty cycle and according to a predetermined period; and means responsive to said first signal for generating said second signal, so that when said first duty cycle is less than a minimum duty cycle, said second signal indicates switching for said minimum duty cycle less often than once per said period.

5. A switched resistor regulator as in claim 4, wherein said means for generating comprises means for receiving a third signal;

means for combining said first and third signal to generate said second signal; and means for transmitting said second signal to said means for periodically switching.

6. A switched resistor regulator as in claim 5, wherein said third signal comprises a time-varying voltage signal.

7. A switched resistor regulator as in claim 5, wherein said third signal comprises a periodic signal with a period greater than said predetermined period.

8. A switched resistor regulator as in claim 5, wherein said means for combining comprises a summing circuit.

9. A switched resistor regulator, comprising means for receiving a signal indicative of a duty cycle;

means for altering said signal when said signal indicates a duty cycle less than a predetermined minimum duty cycle, so that said altered signal indicates a duty cycle greater than said minimum duty cycle for part of a periodic episode of time;

means responsive to said altered signal for generating a pulse train;

means for periodically switching according to said pulse train.

10. A switched resistor regulator as in claim 9, wherein said means for altering comprises means for receiving a second signal;

means for combining said signal indicative of a duty cycle and said second signal to generate said altered signal; and means for transmitting said altered signal to said means for generating.

11. A switched resistor regulator as in claim 10, wherein said second signal comprises a time-varying voltage signal.

12. A switched resistor regulator as in claim 10, wherein said second signal comprises a periodic signal with a period equal to a period of said periodic episode of time.

13. A switched resistor regulator as in claim 10, wherein said means for combining comprises a summing circuit.

14. A switched resistor regulator, comprising means for receiving a signal indicative of a duty cycle;

means for defining a minimum duty cycle;

means responsive to said signal for generating a pulse train with a predetermined period and with pulses occurring each period and having a duty cycle equal to said duty cycle when said duty cycle exceeds said minimum duty cycle; and means responsive to said signal for generating a pulse train with a predetermined period and with pulses occurring less often than once per said period and having a duty cycle substantially equal to said minimum duty cycle when said duty cycle is less than said minimum duty cycle.

15. A switched resistor regulator, comprising a circuit;

resistive means;

means for periodically switching said resistive means into and out of electrical connection with said circuit;

means for generating a pulse train for controlling said means for switching;

means for receiving a desired set point voltage;

means for combining said desired set point voltage with a periodic voltage signal to generate a combined signal; and means for transmitting said combined signal to said means for generating a pulse train.

16. A switched resistor regulator, comprising a circuit, resistive means, a plurality of means for switching said resistive means into and out of electrical connection with said circuit; and means for staggering a minimum turn-on voltage of at least one of said plurality of means for switching, whereby said minimum turn-on voltage of said one of said plurality of means for switching differs from a minimum turn-on voltage of a second one of said plurality of means for switching.

17. A method of operating a switched resistor regulator, comprising the steps of receiving a first signal indicative of a duty cycle; and periodically switching according to an average duty cycle equal to said duty cycle, by periodically switching according to said duty cycle and according to a predetermined first period, and by periodically switching according to a minimum duty cycle and a second period when said signal indicates a duty cycle less than said minimum duty cycle.

18. A method of operating a switched resistor regulator, comprising the steps of receiving a signal indicative of a duty cycle;

periodically switching according to said duty cycle and according to a predetermined period when said duty cycle exceeds a minimum duty cycle; and periodically switching according to a minimum duty cycle less often than once per said period when said signal indicates a duty cycle less than said minimum duty cycle.

19. A method of operating a switched resistor regulator, comprising the steps of receiving a first signal indicative of a duty cycle;

generating a second signal, so that when said first signal indicates a duty cycle less than a minimum duty cycle, said second signal indicates switching for said minimum duty cycle less often than once per said period; and periodically switching according to said second signal.

20. A method as in claim 19, wherein said step of generating comprises the steps of receiving a third signal; and combining said first and third signal to generate said second signal.

21. A method as in claim 20, wherein said step of combining comprises the step of summing.

22. A method of operating a switched resistor regulator, comprising the steps of receiving a signal indicative of a duty cycle;
altering said signal when said signal indicates a duty cycle less than a predetermined minimum duty cycle, so that said altered signal indicates a duty cycle greater than said minimum duty cycle for part of a periodic episode of time;
generating a pulse train in accordance with said altered signal;
periodically switching according to said pulse train.

23. A method as in claim 22, wherein said step of altering comprises the steps of
receiving a second signal; and
combining said signal indicative of a duty cycle and said second signal to generate said altered signal.

24. A switched resistor regulator as in claim 21, wherein said step of combining comprises the step of summing.

25. A method of operating a switched resistor regulator, comprising the steps of
receiving a signal indicative of a duty cycle;
defining a minimum duty cycle;
generating a pulse train with a predetermined period and with pulses occurring each period and having a duty cycle equal to said duty cycle when said duty cycle exceeds said minimum duty cycle; and
generating a pulse train with a predetermined period and with pulses occurring less often than once per said period and having a duty cycle substantially equal to said minimum duty cycle when said duty cycle is less than said minimum duty cycle.

26. A method of operating a switched resistor regulator having resistive means and a plurality of means for switching said resistive means into and out of electrical connection with a circuit, comprising the step of
staggering a minimum turn-on voltage of at least one of said plurality of means for switching, whereby said minimum turn-on voltage of said one of said plurality of means for switching differs from a minimum turn-on voltage of a second one of said plurality of means for switching.

27. In a switched resistor regulator having means for receiving a signal indicative of a first duty cycle, said switched resistor regulator also having a defined minimum duty cycle and a predetermined switching period, an electrical signal, comprising
a pulse train with a predetermined period, with pulses occurring less often than once per said period, and having a pulse train duty cycle substantially equal to said minimum duty cycle when said first duty cycle is less than said minimum duty cycle.

28. A switched resistor regulator as in claim 4, wherein said first signal comprises a desired set point voltage.

29. A switched resistor regulator as in claim 4, wherein said second signal comprises a signal input to a pulse-width modulator.

30. A switched resistor regulator as in claim 5, wherein said third signal comprises a dither voltage.

31. A switched resistor regulator as in claim 2, comprising
a circuit;
resistive means;
wherein said means for periodically switching comprises a plurality of means for switching said resistive means into and out of electrical connection with said circuit; and
means for offsetting a minimum duty factor of at least one of said plurality of means for switching, whereby said minimum duty factor of said one of said plurality of means for switching differs from a minimum duty factor of a second one of said plurality of means for switching.

32. A switched resistor regulator as in claim 31, wherein at least one of said plurality of means for switching comprises means for comparing said signal indicative of a duty cycle with a second signal.

33. A switched resistor regulator as in claim 32, comprising means for offsetting said second signal or one of said plurality of means for switching from said second signal for a different one of said plurality of means for switching, whereby said signal indicative of a duty cycle is compared with signals having differing values.

34. A switched resistor regulator as in claim 33, wherein said means for offsetting comprises a diode.

35. A switched resistor regulator as in claim 3, wherein said means for staggering comprises means for offsetting a minimum duty factor at which switching begins of at least one of said plurality of means for switching, whereby said minimum duty factor of said one of said plurality of means for switching differs from a minimum duty factor of a second one of said plurality of means for switching.

36. A switched resistor regulator as in claim 3, wherein said means for staggering comprises a diode.

37. A switched resistor regulator, comprising
a circuit;
resistive means;
a plurality of means for switching said resistive means into and out of electrical connection with said circuit; and
means for offsetting a minimum duty factor of at least one of said plurality of means for switching, whereby said minimum duty factor of said one of said plurality of means for switching differs from a minimum duty factor of a second one of said plurality of means for switching.

38. A switched resistor regulator as in claim 37, wherein at least one of said plurality of means for switching comprises means for comparing said signal indicative of a duty cycle with a second signal.

39. A switched resistor regulator as in claim 38, comprising means for offsetting said second signal for one of said plurality of means for switching from said second signal for a different one of said plurality of means for switching, whereby said signal indicative of a duty cycle is compared with signals having differing values.

40. A switched resistor regulator as in claim 39, wherein said means for offsetting comprises a diode.

41. A switched resistor regulator as in claim 16, wherein said means for staggering comprises means for offsetting a minimum duty factor at which switching begins of at least one of said plurality of means for switching, whereby said minimum duty factor of said one of said plurality of means for switching differs from a minimum duty factor of a second one of said plurality of means for switching.

42. A switched resistor regulator as in claim 16, wherein said means for staggering comprises a diode.

43. A method of operating a switched resistor regulator having resistive means and a plurality of means for switching said resistive means into and out of electrical connection with a circuit, comprising the step of
offsetting a minimum duty factor of at least one of said plurality of means for switching, whereby said minimum duty factor of said one of said plurality of means for switching differs from a minimum duty factor of a second one of said plurality of means for switching.

44. A switched resistor regulator as in claim 43, wherein at least one of said plurality of means for switching comprises means for comparing said signal indicative of a duty cycle with a second signal.

45. A switched resistor regulator as in claim 44, comprising means for offsetting said second signal for one of said plurality of means for switching from said second signal for a different one of said plurality of means for switching, whereby said signal indicative of a duty cycle is compared with signals having differing values.

46. A switched resistor regulator as in claim 45, wherein said means for offsetting comprises a diode.

47. A method as in claim 26, wherein said step of staggering comprises the step of offsetting a minimum duty factor at which switching begins of at least one of said plurality of means for switching, whereby said minimum duty factor of said one of said plurality of means for switching differs from a minimum duty factor of a second one of said plurality of means for switching.

* * * * *